US006258879B1

(12) United States Patent
Adedeji et al.

(10) Patent No.: US 6,258,879 B1
(45) Date of Patent: Jul. 10, 2001

(54) POLYPHENYLENE ETHER RESIN CONCENTRATES CONTAINING ORGANIC PHOSPHATES

(75) Inventors: Adeyinka Adedeji, Albany; Robert Hossan, Delmar; William E. Pecak, Cohoes; Sai-Pei Ting, Slingerlands, all of NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/285,574

(22) Filed: Apr. 2, 1999

(51) Int. Cl.$^7$ .................................................. C08K 3/32
(52) U.S. Cl. ..................... 524/127; 524/141; 524/611; 523/351; 525/241
(58) Field of Search .................................. 524/127, 141, 524/611; 523/351; 525/241

(56) References Cited

U.S. PATENT DOCUMENTS

| | | |
|---|---|---|
| 3,169,925 | 2/1965 | Mahoney . |
| 3,302,893 | 2/1967 | Feder et al. ............................ 241/37 |
| 3,360,591 | 12/1967 | Giammaria et al. . |
| 3,383,435 | 5/1968 | Cizek . |
| 3,561,685 | 2/1971 | Feder ..................................... 241/55 |
| 3,584,799 | 6/1971 | Feder ..................................... 241/44 |
| 3,620,463 | 11/1971 | Feder ..................................... 241/255 |
| 3,883,613 | 5/1975 | Cooper . |
| 4,097,550 | 6/1978 | Haaf et al. . |
| 4,101,503 | 7/1978 | Cooper et al. . |
| 4,101,504 | 7/1978 | Cooper et al. . |
| 4,101,505 | 7/1978 | Cooper et al. . |
| 4,113,800 | 9/1978 | Lee, Jr. . |
| 4,128,602 | 12/1978 | Katchman et al. . |
| 4,139,574 | 2/1979 | Cooper et al. . |
| 4,154,712 | 5/1979 | Lee, Jr. . |
| 4,191,685 | 3/1980 | Haaf et al. . |
| 4,212,832 | 7/1980 | Mitschke et al. . |
| 4,246,169 | 1/1981 | Norris et al. . |
| 4,254,775 | 3/1981 | Langer . |
| 4,463,130 | 7/1984 | Serini et al. . |
| 4,520,152 | 5/1985 | Axelrod . |
| 4,692,488 | 9/1987 | Kress et al. . |
| 4,740,554 | 4/1988 | Kress et al. . |
| 4,766,165 | 8/1988 | Kress et al. . |
| 4,837,276 | 6/1989 | Fuhr et al. . |
| 4,879,330 | 11/1989 | De Munck et al. . |
| 4,927,870 | 5/1990 | Ogoe et al. . |
| 5,061,745 | 10/1991 | Wittmann et al. . |
| 5,071,894 | 12/1991 | Weil et al. . |
| 5,084,496 | 1/1992 | Ishida et al. . |
| 5,268,425 | * 12/1993 | Furuta et al. ......................... 525/68 |
| 5,270,386 | * 12/1993 | Laughner ............................... 525/66 |
| 5,278,212 | 1/1994 | Ishihara et al. . |
| 5,294,654 | * 3/1994 | Hellstern-Burnell et al. ....... 524/127 |
| 5,382,613 | * 1/1995 | Bergner et al. ...................... 524/102 |
| 5,594,054 | 1/1997 | Lee, Jr. . |
| 5,712,330 | * 1/1998 | Funayama et al. .................. 523/206 |
| 5,717,020 | * 2/1998 | Kopytko ............................... 524/425 |
| 5,916,952 | * 6/1999 | Romenesko .......................... 524/493 |

FOREIGN PATENT DOCUMENTS

| | | |
|---|---|---|
| 0 126 971 A1 | 12/1984 | (EP) . |
| 0 491 986 A1 | 1/1992 | (EP) . |
| 0 528 113A1 | 2/1993 | (EP) . |
| 0 611 798 A1 | 8/1994 | (EP) . |
| 2 043 083 | 10/1980 | (GB) . |
| 59-24736 | 2/1984 | (JP) . |
| 59-45351 | 3/1984 | (JP) . |
| 63-5161 | 2/1988 | (JP) . |
| 2-187456 | 7/1990 | (JP) . |
| 4-279660 | 10/1992 | (JP) . |
| 09040858 | 10/1997 | (JP) . |
| WO 96/27637 | 9/1996 | (WO) . |

OTHER PUBLICATIONS

Japanese Patent Abstract 59202240 A, dated Nov. 16, 1984, by Inventor:. T. Yoshinori et al.
Japanese Patent Abstract 02187456 A, dated Jul. 23, 1990, by Inventor: M. Masataka et al.

\* cited by examiner

*Primary Examiner*—Robert Dawson
*Assistant Examiner*—Kuo-Liang Peng

(57) ABSTRACT

The invention relates to a process for the manufacture of a thermoplastic composition comprising a polyphenylene ether resin and a styrenic resin wherein the processes comprises a concentrate of polyphenylene ether resin with an organic phosphate compound. The concentrate allows for ease of handling of polyphenylene ether resin without the risk of dust ignition while obtaining substantially the same physical properties as obtained with polyphenylene ether resin powder.

The invention also relates to articles formed out of the compositions made by the process of the invention.

17 Claims, No Drawings

POLYPHENYLENE ETHER RESIN CONCENTRATES CONTAINING ORGANIC PHOSPHATES

CROSS-REFERENCE TO RELATED APPLICATIONS

Not applicable.

FEDERALLY SPONSORED RESEARCH

Not applicable.

BACKGROUND OF THE INVENTION

1. Field of the Invention

The invention relates to a process for the manufacture of a thermoplastic composition. In particular, the invention relates to a process for the manufacture of a thermoplastic composition comprising polyphenylene ether resin.

2. Brief Description of the Related Art

Poly(phenylene ether) resins (referred to hereafter as "PPE") are commercially attractive materials because of their unique combination of physical, chemical, and electrical properties. Commercially, most PPE are sold as blends with predominantly high impact polystyrene resins. PPE are miscible with polystyrene resins in all proportions and because of the very high glass transition temperatures of PPE, the blends of PPE with polystyrene resins possess higher heat resistance than that of the polystyrene resins alone. Moreover, the combination of PPE with high impact polystyrene resins results in additional overall properties such as high flow and ductility. Examples of such blends can be found in U.S. Pat. Nos. 3,383,435; 4,097,550; 4,113,800; 4,101,503; 4,101,504; 4,101,505; 4,128,602; 4,139,574; and 4,154,712 among others. The properties of these blends can be further enhanced by the addition of various additives such as impact modifiers, flame retardants, light stabilizers, processing stabilizers, heat stabilizers, antioxidants and fillers.

Commercial PPE are produced as a relatively fine powder form typically having at least 10% by weight, often at least 20% by weight fine particles of less than about 75 microns in size. Particles less than about 75 microns in size are believed to lead to dust explosion hazards. Consequently these powders require special handling procedures to control dust and potential spark ignition hazards associated with such powders. Such handling procedures include grounding of equipment and use of inert gas blankets to exclude oxygen. It would be commercially advantageous to be able to ship PPE to various locations around the world for compounding into resin compositions to serve local market needs. However, the handling procedures as described above require significant investment for equipment modifications and consequently limit the commercial feasibility for such compounding flexibility. Conversion of PPE powder using standard compounding extruders followed by pelletization of the extrudate to obtain pellets having dimensions of about 3 mm by 3 mm has been attempted as a solution to the problems associated by PPE powder. Unfortunately, the physical properties of many resin compositions made using the pellets are inferior as compared to control compositions made with PPE powder and the pellets must be ground to a smaller size in order to obtain physical properties that closely approximate those of control compositions. Consequently, the utility of the PPE pellet approach has been limited.

It is therefore apparent there continues to be a need for improved processes to manufacture resin compositions containing PPE.

SUMMARY OF THE INVENTION

The needs discussed above have been generally satisfied by the discovery of a process for the manufacture of a thermoplastic composition containing:

a) at least one polyphenylene ether resin, and b) optionally, at least one polystyrene resin;

wherein the process comprises preparing a concentrate of polyphenylene ether resin with an organic phosphate compound. The composition may further comprise at least one of the following optional components: thermoplastic resins such as, for example, polyolefins, polyetherimides, polyethersulfones, polysulfones, polyamides, polyesters, and polyarylene sulfides, compatibilizers, impact modifiers, anti-oxidants, flame retardants, drip suppressers, crystallization nucleators, dyes, pigments, colorants, reinforcing agents, fillers, stabilizers, and antistatic agents.

The description which follows provides further details regarding this invention.

DESCRIPTION OF THE DRAWINGS

Not applicable.

DETAILED DESCRIPTION OF THE INVENTION

A process for the manufacture of a thermoplastic composition comprises preparing a solid concentrate comprising a polyphenylene ether resin and an organic phosphate compound, wherein said solid concentrate has less than 5% by weight, and preferably less than 1% by weight, of particles less than about 75 micrometers. The concentrate allows for ease of handling of polyphenylene ether resin while obtaining substantially the same physical properties as obtained with polyphenylene ether resin powder.

The invention also relates to articles formed out of the compositions made by the process of the invention.

Polyphenylene ether resin, hereinafter "PPE", per se, are known polymers comprising a plurality of structural units of the formula (I):

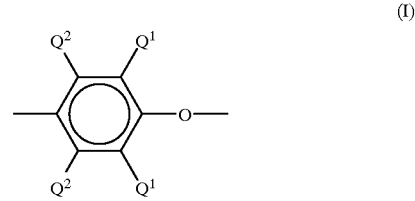

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes, as well as coupled PPE in which coupling agents such as low molecular weight polycarbonates, quinones, heterocycles and formals undergo reaction in known manner with the hydroxy groups of two PPE chains to produce a higher molecular weight polymer.

It will be apparent to those skilled in the art from the foregoing that the PPE contemplated for use in the present invention include all those presently known, irrespective of variations in structural units or ancillary chemical features.

The PPE generally have an intrinsic viscosity (I.V.) often between about 0.10–0.60 dl./g., preferably in the range of about 0.25–0.48 dl./g., all as measured in chloroform at 25° C. It is also possible to utilize a high intrinsic viscosity PPE and a low intrinsic viscosity PPE in combination. Determining an exact ratio, when two intrinsic viscosities are used, will depend somewhat on the exact intrinsic viscosities of the PPE used and the ultimate physical properties that are desired. It is preferred that the polyphenylene ether resin be present at about 5 to about 70 percent by weight based on the weight of the entire composition.

The PPE resin compositions of the present invention optionally contain at least one nonelastomeric polymer of an alkenylaromatic compound. Suitable polymers of this type may be prepared by methods known in the art including bulk, suspension and emulsion polymerization. They generally contain at least about 25% by weight of structural units derived from an alkenylaromatic monomer of the formula (II):

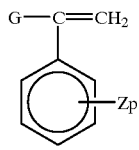

(II)

wherein G is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–68% styrene and about 2–32% diene monomer. These rubber modified polystyrenes include high impact polystyrene (commonly referred to as HIPS). Non-elastomeric block copolymer compositions of styrene and butadiene can also be used that have linear block, radial block or tapered block copolymer architectures. They are commercially available from such companies as Fina Oil as under the trademark FINACLEAR and Phillips under the trademark K-RESINS.

The amount of the polymer of a nonelastomeric alkenylaromatic compound, when one is used, is an amount effective to improve the flow and processability of the composition. Improved flow can be indicated by reduced viscosity or reduced injection molding pressures needed to fill a part during an injection molding process. Generally, the nonelastomeric alkenylaromatic compound is utilized in the range of about 20% to about 60% by weight based on the total weight of the composition. The preferred range is about 30% to about 60% by weight; based on the total weight of the composition.

The compositions of the present invention may also contain at least one impact modifier. The impact modifier may be used alone or in combination with a nonelastomeric alkenylaromatic compound. The impact modifiers include block (typically diblock, triblock or radial teleblock) copolymers of alkenyl aromatic compounds and dienes. Most often at least one block is derived from styrene and at least one block from at least one of butadiene and isoprene. Especially preferred are the triblock and diblock copolymers comprising polystyrene blocks and diene derived blocks wherein the aliphatic unsaturation has been preferentially removed with hydrogenation. Mixtures of various copolymers are also sometimes useful. The weight average molecular weights of the impact modifiers are typically in the range of about 50,000 to 300,000. Block copolymers of this type are available commercially from a number of sources, including Phillips Petroleum under the trademark SOLPRENE, Shell Chemical Co. under the trademark KRATON, and Kuraray under the trademark SEPTON.

Various mixtures of the aforementioned impact modifiers are also sometimes useful. The amount of the impact modifier generally present, when one is used, is an amount effective to improve the physical properties, for example, the ductility of the composition when compared to the same composition without an impact modifier. Improved ductility can be indicated by increased impact strength, increased tensile elongation to break, or both increased impact strength and increased tensile elongation to break. Generally, when an impact modifier is present, it is utilized in the range of about 1% to about 20% by weight based on the total weight of the composition. A preferred range is about 1% to about 8% by weight; based on the total weight of the composition. The exact amount and types or combinations of impact modifiers utilized will depend in part on the requirements needed in the final blend composition.

Organic phosphate compounds are another component of the present invention. The organic phosphate is preferably an aromatic phosphate compound of the formula (III):

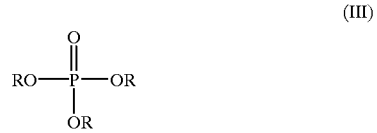

(III)

where R is the same or different and is alkyl, cycloalkyl, aryl, alkyl substituted aryl, halogen substituted aryl, aryl substituted alkyl, halogen, or a combination of any of the foregoing, provided at least one R is aryl.

Examples include phenyl bisdodecyl phosphate, phenyl-bisneopentyl phosphate, phenyl-bis (3,5,5'-tri-methyl-hexyl phosphate), ethyldiphenyl phosphate, 2-ethyl-hexyldi(p-tolyl) phosphate, bis-(2-ethylhexyl) p-tolylphosphate, tritolyl phosphate, bis-(2-ethylhexyl) phenyl phosphate, tri-(nonylphenyl) phosphate, di (dodecyl) p-tolyl phosphate, tricresyl phosphate, triphenyl phosphate, dibutylphenyl phosphate, 2-chloroethyldiphenyl phosphate, p-tolyl bis(2, 5,5'-trimethylhexyl) phosphate, 2-ethylhexyldiphenyl phosphate, and the like. The preferred phosphates are those in which each R is aryl. Especially preferred is triphenyl phosphate, which may be either unsubstituted or substituted, for example, isopropylated triphenyl phosphate.

Alternatively, the organic phosphate can be a di- or polyfunctional compound or polymer having the formula

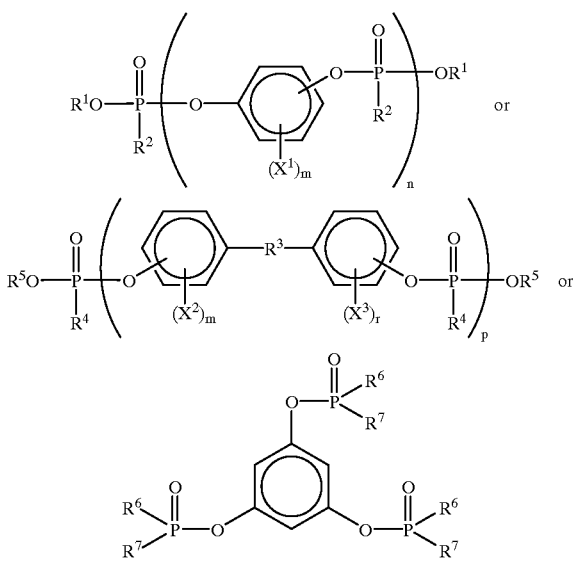

including mixtures thereof, in which $R^1$, $R^3$ and $R^5$ are, independently, hydrocarbon; $R^2$, $R^4$, $R^6$ and $R^7$ are, independently, hydrocarbonoxy; $X^1$, $X^2$ and $X^3$ are halogen; m and r are 0 or integers from 1 to 4, and n and p are from 1 to 30.

Examples include the bis diphenyl phosphates of resorcinol, hydroquinone and bisphenol-A, respectively, or their polymeric counterparts.

Methods for the preparation of the aforementioned di- and polyfunctional aromatic phosphates are described in British Patent No. 2,043,083.

Another development is the use of certain cyclic phosphates, for example, diphenyl pentaerythritol diphosphate, as a flame retardant agent for polyphenylene ether resins, as is described by Axelrod in U.S. Pat. No. 4,254,775.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl) phosphine oxide, or tetrakis(hydroxymethyl) phosphonium chloride. These flame-retardant additives are commercially available.

Preferred phosphate flame retardants include those based upon resorcinol such as, for example, resorcinol tetraphenyl diphosphate, as well as those based upon bis-phenols such as, for example, bis-phenol A tetraphenyl diphosphate. Phosphates containing substituted phenyl groups are also preferred. In an especially preferred embodiment, the organophosphate is selected from the group consisting of butylated triphenyl phosphate ester, resorcinol tetraphenyl diphosphate, bis-phenol A tetraphenyl diphosphate, and mixtures containing at least one of the foregoing.

In the preparation of the concentrate of PPE with the organic phosphate it is desirable to have a relatively large amount of the organic phosphate present so as to result in a high value concentrate. By high value is meant that the concentrate can be let-down to a relatively large degree in order to prepare a wide variety of final formulations from a single concentrate composition. It is preferred that the concentrate contain at least 5%, preferably at least 15%, and most preferably at least about 20% or more organic phosphate compound by weight based upon the weight of the PPE. The maximum amount of phosphate compound that can be present can also vary widely and is generally limited by the maximum amount that can be added before the concentrates becomes sticky and begins to agglomerate. This amount is generally less than about 50% by weight of organic phosphate based on the total weight of the PPE/organic phosphate concentrate.

In the final composition, the flame retardant is present in at least the minimum amount necessary to impart a degree of flame retardancy to the composition to pass the UL-94 protocol at a rating of V-0, V-1, or V-2 depending on the specific application requirements. The particular amount will vary, depending on the molecular weight of the organic phosphate, the amount of the flammable resin present and possibly other normally flammable ingredients which might also be included in the composition.

For compositions comprising polyphenylene ether resin, preferred compositions have the major components which make up the composition in an amount within the following preferred ranges:

Polyphenylene ether resin, (a) about 30 to about 70 parts;

Non-elastomeric polymer of an alkenylaromatic compound, (b) about 20 to about 60 parts; and Organic phosphate, (c) about 10 to about 30 parts;

based on 100 parts by weight of (a), (b), and (c) together.

Compositions of the present invention can also include effective amounts of at least one additive selected from the group consisting of thermoplastic resins such as, for example, polyolefins, polyetherimides, polyethersulfones, polysulfones, polyamides, polyesters, and polyarylene sulfides, compatibilizers, impact modifiers, anti-oxidants, drip retardants, crystallization nucleators, dyes, pigments, colorants, synergists, reinforcing agents, fillers, stabilizers, and antistatic agents. These additives are known in the art, as are their effective levels and methods of incorporation. Effective amounts of the additives vary widely, but they are usually present in an amount up to about 60% or more by weight, based on the weight of the entire composition.

The resin compositions used in the present invention can be prepared by a variety of methods involving intimate admixing of the materials with any additional additives desired in the formulation. Suitable procedures include solution blending and melt blending. Because of the availability of melt blending equipment in commercial polymer processing facilities, melt processing procedures are generally preferred. Examples of equipment used in such melt compounding methods include: co-rotating and counter-rotating extruders, single screw extruders, disc-pack processors and various other types of extrusion equipment. In some instances, the compounded material exits the extruder through small exit holes in a die and the resulting strands of molten resin are cooled by passing the strands through a water bath. The cooled strands can be chopped into small pellets for packaging and further handling.

All of the ingredients may be added initially to the processing system, or else certain additives may be pre-compounded with each other as in the case of the concentrates of the present disclosure. It is sometimes advantageous to introduce the organic phosphate compound as a liquid into the compounder through the use, for example, of a liquid injection system as is known in the compounding art. It is also sometimes advantageous to employ at least one vent port in each section between the feed ports to allow venting (either atmospheric or vacuum) of the melt. Those of ordinary skill in the art will be able to adjust blending times and temperatures, as well as component addition location and sequence, without undue additional experimentation.

It should also be clear that improved molded articles prepared from the compositions of the present invention represent an additional embodiment of this invention.

All patents cited by reference are incorporated by reference herein.

The following examples are provided to illustrate some embodiments of the present invention. They are not intended to limit the invention in any aspect. All percentages are by weight based on the total weight of the entire composition, unless otherwise indicated.

EXPERIMENTAL

The following examples are illustrative of the compositions of the present invention.

Compositions were evaluated comparing PPE in the form of (1) powder (control), (2) ground into a particle size of less than about 3 mm by about 3 mm, (3) pellets having a size of about 1 mm by 3 mm (mini), and (4) pellets having a size of 3 mm by 3 mm (regular). To contrast the compositions derived directly from PPE, concentrates of PPE with either HIPS or a phosphate flame retardant (e.g., tetraphenyl resorcinol diphosphate: "RDP") were also evaluated as either pellets having a size of 3 mm by 3 mm (regular), or alternatively as ground into a particle size of less than about 3 mm by about 3 mm. The energy input into the PPE was varied as "high" by addition of the PPE into the first barrel of an eleven barrel twin-screw extruder, or "low" by addition of the PPE into the seventh barrel of an eleven barrel twin-screw extruder. The intrinsic viscosity (I.V.) of the PPE was varied between 0.33, 0.40, and 0.46. The standard final formulation was as follows with all parts by weight: PPE: 41.75; HIPS: 37.22; tetraphenyl resorcinol diphosphate: 17.6; polystyrene-poly(butadiene)-polystyrene block copolymer: 1.7; LLDPE: 1.1; tridecylphosphite: 0.39; ZnO: 0.1; ZnS: 0.1: TSAN: 0.2.

The compositions were extruded on a Werner-Pfleiderer twin-screw extruder at a temperature of about 280–320° C. with vacuum applied to the melt during compounding. For concentrates, the vacuum level is typically low, e.g., 0 to about 3 inches. For final compositions, the vacuum level is typically higher, e.g., about 3 to about 30 inches. The resultant compositions were molded using a van Dom injection molding machine using a temperature set of about 275–300° C. and a mold temperature of about 80–110° C. Samples of the compositions were also subjected to measurement of notched Izod impact strength according to ASTM D256 (employing a sample size of 2.5 inch by 0.5 inch by 0.125 inch), Dynatup (energy to fracture, falling dart test) strength according to ASTM D3763 (using 4 inch diameter by 0.125 inch disks), flexural modulus and flexural strength according to ASTM D790 (employing a sample size of 6 inch by 0.5 inch by 0.25 inch), and tensile yield and tensile elongation at break according to ASTM D638.

TABLE 1

| Sample | | | 1 | 2 | 3 | 4 | 5 | 6 | 7 |
|---|---|---|---|---|---|---|---|---|---|
| Energy Input | | | High | Low | High | Low | High | Low | High |
| PPE IV | | | 0.33 | 0.33 | 0.4 | 0.4 | 0.46 | 0.46 | 0.33 |
| Pellet Type[1] | | | R | R | R | R | R | R | M |
| Properties | | | | | | | | | |
| HDT @ 264 psi | | °F. | 172.3 | 170.8 | 170.7 | 168.5 | 168 | 168.6 | 171.3 |
| Notched Izod, 73° F. | | ft-lb/in | 1.87 | 2.18 | 3.5 | 4.23 | 3.43 | 3.6 | 1.89 |
| | std. dev. | | 0.038 | 0.198 | 0.684 | 0.847 | 0.292 | 0.153 | 0.112 |
| Notched Izod, −20° F. | | ft-lb/in | 1.36 | 1.5 | 1.62 | 1.62 | 1.61 | 1.45 | 1.34 |
| | std. dev. | | 0.045 | 0.113 | 0.136 | 0.125 | 0.127 | 0.058 | 0.166 |
| Energy to Failure, 73° F. | | ft-lb | 8.93 | 10.27 | 11.62 | 9.47 | 7.99 | 12.42 | 8.41 |
| | std. dev. | | 2.5 | 3.65 | 4.56 | 3.19 | 2.74 | 2.61 | 4.58 |
| Total Energy, 73° F. | | ft-lb | 12.01 | 14.57 | 17.68 | 18.93 | 12.97 | 15.45 | 14.49 |
| | std. dev. | | 3.79 | 4.68 | 3.81 | 1.54 | 0.95 | 1.49 | 2.04 |
| Energy to Failure, −20° F. | | ft/lb | 1.92 | 1.58 | 2.66 | 2.71 | 3.74 | 3.16 | 1.78 |
| | std. dev. | | 0.45 | 0.48 | 0.87 | 1.87 | 1.85 | 2.39 | 0.56 |
| Total Energy, −20° F. | | ft/lb | 2.18 | 1.93 | 2.89 | 3.41 | 5 | 3.82 | 2.02 |
| | std. dev. | | 0.38 | 0.46 | 0.72 | 2.02 | 1.89 | 2.13 | 0.56 |
| Flexural Modulus, 73° F. | | kpsi | 346 | 347 | 343 | 343 | 344 | 342 | 347 |
| | std. dev. | kpsi | 4.6 | 1.5 | 3.2 | 0.9 | 1.6 | 0.7 | 4.9 |
| Flex Str. @ yield, 73° F. | | psi | 11020 | 10930 | 11110 | 11040 | 10970 | 10920 | 10910 |
| | std. dev. | | 189 | 43 | 20 | 47 | 34 | 60 | 37 |
| Flex E. @ break, 73° F. | | lb-in | 34.66 | 35.04 | 35.39 | 34.91 | 34.48 | 34.87 | 34.76 |
| | std. dev. | | 0.46 | 0.8 | 0.99 | 0.84 | 0.38 | 0.66 | 0.62 |
| Ten. Str. @ yield, 73° F. | | psi | 7936 | 7757 | 7826 | 7877 | 7750 | 7765 | 7725 |
| | std. dev. | | 20 | 34 | 63 | 63 | 31 | 15 | 42 |
| Ten. Str. @ break, 73° F. | | psi | 6498 | 6591 | 6705 | 6824 | 6893 | 6969 | 6432 |
| | std. dev. | | 169 | 50 | 85 | 106 | 90 | 60 | 134 |
| T. Elong. @ break, 73° F. | | % | 28.47 | 25.92 | 25 | 23.64 | 20.21 | 17.18 | 29.88 |
| | std. dev. | | 1.93 | 1.25 | 2.21 | 3.86 | 1.24 | 1.44 | 2.29 |

| Sample | | | 8 | 9 | 10 | 11 | 12 |
|---|---|---|---|---|---|---|---|
| Energy Input | | | Low | High | Low | High | Low |
| PPE IV | | | 0.33 | 0.4 | 0.4 | 0.46 | 0.46 |
| Pellet Type[1] | | | M | M | M | M | M |
| Properties | | | | | | | |
| HDT @ 264 psi | | °F. | 170.5 | 171.8 | 167.2 | 171.2 | 170 |
| Notched Izod, 73° F. | | ft-lb/in | 2 | 3.22 | 4.48 | 4.04 | 3.37 |
| | std. dev. | | 0.098 | 0.14 | 0.589 | 0.438 | 0.191 |
| Notched Izod, −20° F. | | ft-lb/in | 1.4 | 1.55 | 1.71 | 1.52 | 1.65 |
| | std. dev. | | 0.038 | 0.144 | 0.127 | 0.128 | 0.139 |

TABLE 1-continued

|  |  |  |  |  |  |  |  |
|---|---|---|---|---|---|---|---|
| Energy to Failure, 73° F. |  | ft-lb | 11.6 | 14.07 | 11.03 | 10.31 | 9.38 |
|  | std. dev. |  | 2.47 | 2.82 | 1.36 | 3.8 | 4.17 |
| Total Energy, 73° F. |  | ft-lb | 12.81 | 19.77 | 19.11 | 15.99 | 13.7 |
|  | std. dev. |  | 3.44 | 2.79 | 2.1 | 0.88 | 1.22 |
| Energy to Failure, −20° F. |  | ft-lb | 2.12 | 2.36 | 1.77 | 2.29 | 2.54 |
|  | std. dev. |  | 0.48 | 0.63 | 0.33 | 0.99 | 0.81 |
| Total Energy, −20° F. |  | ft-lb | 2.27 | 2.55 | 2.14 | 2.75 | 4.88 |
|  | std. dev. |  | 0.49 | 0.58 | 0.41 | 0.72 | 1.91 |
| Flexural Modulus, 73° F. |  | kpsi | 341 | 348 | 344 | 347 | 343 |
|  | std. dev. | kpsi | 4.2 | 4.7 | 1.7 | 2.9 | 2.2 |
| Flex Str. @ yield, 73° F. |  | psi | 10880 | 11210 | 11200 | 11320 | 11080 |
|  | std. dev. |  | 107 | 185 | 42 | 147 | 56 |
| Flex E. @ break, 73° F. |  | lb-in | 34.95 | 35.17 | 35.72 | 35.4 | 35.25 |
|  | std. dev. |  | 0.45 | 0.78 | 0.87 | 0.41 | 0.47 |
| Ten. Str. @ yield, 73° F. |  | psi | 7666 | 7930 | 7906 | 7930 | 7885 |
|  | std. dev. |  | 103 | 20 | 15 | 72 | 80 |
| Ten. Str. @ break, 73° F. |  | psi | 6343 | 6809 | 6674 | 7032 | 7175 |
|  | std. dev. |  | 286 | 134 | 193 | 101 | 92 |
| T. Elong. @ break, 73° F. |  | % | 29.92 | 23.86 | 25.62 | 19.03 | 14.85 |
|  | std. dev. |  | 4.54 | 2.49 | 2.23 | 2.29 | 1.46 |

[1]R = pellet of 3 mm by 3 mm; M = pellet of 1 mm by 3 mm; G = ground to less than 3 mm by 3 mm; P = powder – control

TABLE 2

| Sample |  |  | 13 | 14 | 15 | 16 | 17 | 18 | 19 | 20 | 21 |
|---|---|---|---|---|---|---|---|---|---|---|---|
| Energy Input |  |  | High | Low | High | Low | High | Low | High | High | High |
| PPE IV |  |  | 0.33 | 0.33 | 0.4 | 0.4 | 0.46 | 0.46 | 0.33 | 0.4 | 0.46 |
| Pellet Type[1] |  |  | G | G | G | G | G | G | P | P | P |
| Properties |  |  |  |  |  |  |  |  |  |  |  |
| HDT @ 264 psi |  | ° F. | 167.9 | 169.3 | 172 | 171.6 | 170.8 | 170 | 167.8 | 168.7 | 172.2 |
| Notched Izod, 73° F. | std. dev. | ft-lb/in | 1.95 | 2.22 | 4.29 | 4.77 | 4.91 | 5.02 | 2 | 3.81 | 5.77 |
|  |  |  | 0.118 | 0.067 | 0.812 | 0.135 | 0.246 | 0.282 | 0.064 | 0.791 | 0.236 |
| Notched Izod, −20° F. | std. dev. | ft-lb/in | 1.27 | 1.45 | 1.63 | 1.69 | 1.72 | 1.63 | 1.45 | 1.72 | 1.85 |
|  |  |  | 0.036 | 0.079 | 0.106 | 0.056 | 0.06 | 0.12 | 0.094 | 0.148 | 0.139 |
| Energy to Failure, 73° F. | std. dev. | ft-lb | 15.38 | 13.72 | 22.56 | 21.03 | 19.71 | 25.3 | 20.74 | 36.1 | 31.3 |
|  |  |  | 4.21 | 3.47 | 1.95 | 6.76 | 6.38 | 1.86 | 8.73 | 2.62 | 7.8 |
| Total Energy, 73° F. | std. dev. | ft-lb | 17.61 | 17.17 | 26.14 | 25.83 | 24.54 | 32.53 | 24.73 | 36.4 | 34.76 |
|  |  |  | 3.48 | 1.86 | 4.87 | 7.7 | 5.9 | 1.48 | 3.73 | 2.6 | 5.65 |
| Energy to Failure, −20° F. | std. dev. | ft-lb | 2.79 | 3.91 | 3.24 | 3 | 3.46 | 3.62 | 4.75 | 7.99 | 8.55 |
|  |  |  | 0.96 | 1.38 | 0.84 | 1.12 | 0.94 | 0.82 | 1.02 | 3.68 | 4.94 |
| Total Energy, −20° F. | std. dev. | ft-lb | 2.95 | 4.01 | 3.4 | 3.15 | 3.69 | 4.19 | 4.83 | 8.1 | 8.66 |
|  |  |  | 0.87 | 1.31 | 0.72 | 1.03 | 0.78 | 0.35 | 0.95 | 3.59 | 4.89 |
| Flexural Modulus, 73° F. | std. dev. | kpsi kpsi | 338 | 343 | 346 | 345 | 348 | 349 | 336 | 332 | 336 |
|  |  |  | 1.6 | 1.6 | 1.3 | 0.5 | 1.5 | 2.1 | 2.7 | 1.2 | 3.1 |
| Flex Str. @ yield, 73° F. | std. dev. | psi | 10670 | 10950 | 11200 | 11110 | 11290 | 11350 | 10780 | 10820 | 11150 |
|  |  |  | 8 | 12 | 31 | 34 | 27 | 89 | 39 | 9 | 29 |
| Flex E. @ break, 73° F. | std. dev. | lb-in | 33.58 | 34.77 | 35.37 | 34.89 | 35.71 | 35.85 | 34.05 | 34.16 | 35.56 |
|  |  |  | 0.42 | 0.17 | 0.44 | 0.21 | 0.46 | 0.91 | 0.66 | 0.58 | 0.42 |
| Ten. Str. @ yield, 73° F. | std. dev. | psi | 7542 | 7766 | 7960 | 7905 | 7986 | 7975 | 7592 | 7748 | 7880 |
|  |  |  | 9 | 21 | 9 | 15 | 9 | 18 | 35 | 14 | 84 |
| T. Str. @ break, 73° F. | std. dev. | psi | 6108 | 6345 | 6257 | 6244 | 6724 | 6382 | 5957 | 6042 | 6170 |
|  |  |  | 125 | 235 | 27 | 76 | 280 | 152 | 114 | 10 | 86 |
| T. Elong. @ break, 73° F. | std. dev. | % | 32.69 | 27.95 | 32.43 | 29.31 | 24.65 | 31.15 | 32.69 | 31.94 | 37.7 |
|  |  |  | 1.97 | 4.15 | 2.61 | 1.24 | 3.07 | 3.98 | 2.57 | 1.17 | 9.09 |

[1]R = pellet of 3 mm by 3 mm; M = pellet of 1 mm by 3 mm; G = ground to less than 3 mm by 3 mm; P = powder – control The compositions in Tables 1 and 2 compare the same composition wherein the form of the PPE has been varied. Samples 19 to 21 illustrate controls varying the I.V. of the PPE but using the PPE in the powder form as commercially isolated and available. The physical properties obtained with these compositions illustrate the target values that would be desired if the PPE were utilized in an alternate form to that of isolated powder in the same or a new process. Samples 1 to 6 illustrate the physical properties obtained for the same composition varying the I.V. of the PPE but wherein the PPE is in a pellet form having an average size of about 3 mm by about 3 mm. Comparing the properties of samples 1 and 2 to control sample 19 of the same I.V. PPE; or samples 3 and 4 to control sample 20; or samples 5 and 6 to control sample 21 demonstrates the substantially poorer impact strength, especially Dynatup dart impact strength obtained when pellets having an average size of about 3 mm by about 3 mm are utilized. Likewise, the properties of samples 7 and 8 to control sample 19 of the same I.V. PPE; or samples 9 and 10 to control sample 20; or samples 11 and 12 to control sample 21 demonstrates the substantially poorer impact strength, especially Dynatup dart impact strength obtained when mini-pellets having an average size of about 3 mm by about 3 mm are utilized.

In contrast to the results using pellets or mini-pellets, the properties of samples 13 and 14 to control sample 19 of the same I.V. PPE; or samples 15 and 16 to control sample 20; or samples 17 and 18 to control sample 21 demonstrates the substantially better physical properties could be obtained using ground material. It was unexpected that the physical properties, especially the Dynatup dart impact strength, (labeled "Total Energy, 73° F." in the Tables) would be affected by the PPE particle size. It is thought that using a smaller PPE particle than the standard 3 mm by 3 mm pellet, and/or the irregular shape of the ground particles, affords less shear heating during the compounding operation with less thermal and shear degradation of the materials.

TABLE 3

| Sample | | | 22 | 23 | 24 | 25 | 26 | 27 | 28 | 29 |
|---|---|---|---|---|---|---|---|---|---|---|
| PPE/HIPS ratio | | | 90:10 | 90:10 | — | — | 70:30 | 70:30 | — | — |
| PPE/RDP ratio | | | — | — | 90:10 | 90:10 | — | — | 70:30 | 70:30 |
| Energy Input | | | High | High | High | High | High | High | High | High |
| PPE IV | | | 0.40 | 0.46 | 0.40 | 0.46 | 0.40 | 0.46 | 0.40 | 0.46 |
| Pellet Type[1] | | | G | G | G | G | G | G | R | R |
| Properties | | | | | | | | | | |
| HDT @ 264 psi | | ° F. | 173 | 177 | 172.6 | 201.7 | 177.7 | 179.1 | 174.2 | 173.2 |
| Notched Izod, 73° F. | | ft-lb/in | 3.0 | 3.1 | 4.31 | 5.29 | 3.83 | 4.01 | 5.74 | 6.61 |
| | std. dev. | | 0.195 | 0.31 | 0.86 | 0.22 | 0.302 | 0.292 | 0.373 | 0.2 |
| Notched Izod, −20° F. | | ft-lb/in | 1.9 | 1.9 | 2.48 | 3.0 | 1.93 | 2.16 | 2.53 | 2.9 |
| | std. dev. | | 0.384 | 0.384 | 0.23 | 0.189 | 0.235 | 0.414 | 0.278 | 0.417 |
| Energy to Failure, 73° F. | | ft-lb | 6.97 | 12.32 | 8.44 | 9.84 | 11.52 | 12.72 | 21.58 | 26.85 |
| | std. dev. | | 1.87 | 1.82 | 3.36 | 6.4 | 4.84 | 6.67 | 4.84 | 5.06 |
| Total Energy, 73° F. | | ft-lb | 15.94 | 13.0 | 15.52 | 19.53 | 18.14 | 19.41 | 26.88 | 29.86 |
| | std. dev. | | 0.74 | 1.6 | 0.77 | 4.36 | 2.39 | 3.37 | 5.23 | 3.33 |
| Energy to Failure, −20° F. | | ft-lb | 1.59 | 2.87 | 2.75 | 4.69 | 2.51 | 4.7 | 3.88 | 3.07 |
| | std. dev. | | 0.26 | 0.69 | 1.34 | 4.62 | 0.72 | 4.06 | 1.3 | 0.36 |
| Total Energy, −20° F. | | ft-lb | 1.63 | 3.14 | 4.98 | 7.34 | 2.68 | 5.81 | 3.93 | 5.32 |
| | std. dev. | | 0.26 | 0.46 | 2.59 | 3.44 | 0.83 | 4.02 | 1.3 | 2.25 |
| Flexural Modulus, 73° F. | | kpsi | 347 | 344 | 363.7 | 368.7 | 344.3 | 348.9 | 343.3 | 344.7 |
| | std. dev. | kpsi | 2.574 | 4.7 | 3.8 | 3.6 | 2307 | 180 | 2 | 1.6 |
| Flex Str. @ yield, 73° F. | | psi | 11500 | 11350 | 11290 | 12340 | 11320 | 11610 | 11400 | 11450 |
| | std. dev. | | 28 | 104 | 260 | 130 | 63 | 28 | 84 | 30 |
| Flex E. @ break, 73° F. | | lb-in | — | — | 37.75 | 40.05 | — | — | 37.64 | 37.77 |
| | std. dev. | | | | 0.6 | 0.15 | | | 0.35 | 0.25 |
| Ten. Str. @ yield, 73° F. | | psi | 7720 | 7681 | 7512 | 8023 | 7533 | 7671 | 7763 | 7682 |
| | std. dev. | | 16 | 10 | 90 | 54 | 23 | 15 | 13 | 51 |
| T. Str. @ break, 73° F. | | psi | 6429 | 6735 | 6287 | 6843 | 6005 | 6231 | 6085 | 5977 |
| | std. dev. | | 156 | 58 | 106 | 491 | 43 | 222 | 96 | 71 |
| T. Elong. @ break, 73° F. | | % | 22.67 | 19.16 | 30.36 | 25.53 | 30.32 | 29.79 | 25.59 | 25.54 |
| | std. dev. | | 1 | 1.33 | 2.03 | 3.59 | 1.27 | 2.65 | 2.5 | 1.41 |

[1]R = pellet of 3 mm by 3 mm; M = pellet of 1 mm by 3 mm; G = ground to less than 3 mm by 3 mm; P = powder – control The data in Table 3 compares concentrate compositions containing PPE with either HIPS or RDP. As can be seen from these data, especially comparing samples 26 and 27 to 28 and 29 with a 30% by weight loading of the HIPS or RDP, respectively, high value concentrates can be made from PPE with phosphate materials. It was unexpected that concentrates containing so high a loading of phosphate would result in such acceptable physical properties. It was especially unexpected that the dart impact strength values would be so high. The results are also unexpected considering that the PPE/phosphate concentrates of samples 28 and 29 were used as pellets and not as ground material.

It should also be clear that the present invention affords a method to prepare PPE compositions while reducing the dust explosion tendency of PPE powder.

The preceding examples are set forth to illustrate specific embodiments of the invention and are not intended to limit its scope. It should be clear that the present invention includes articles from the compositions as described herein. Additional embodiments and advantages within the scope of the claimed invention will be apparent to one or ordinary skill in the art.

We claim:

1. A process for the manufacture of a polyphenylene ether thermoplastic, comprising:

preparing a solid concentrate comprising a polyphenylene ether resin and at least about 5% by weight of an organic phosphate compound, based upon the weight of the polyphenylene ether resin in the concentrate; wherein said solid concentrate has less than 5% by weight of particles less than about 75 micrometers.

2. The process of claim 1, wherein the concentrate has essentially no particles less than about 75 microns in size.

3. The process of claim 1, wherein the concentrate contains at least about 15% by weight of the organic phosphate compound based upon the weight of the polyphenylene ether resin in the concentrate.

4. The process of claim 1, wherein at concentrate contains at least about 20% by weight of the organic phosphate compound based upon the weight of the polyphenylene ether resin in the concentrate.

5. The process of claim 1, wherein the organic phosphate compound comprises at least one of the group consisting of:

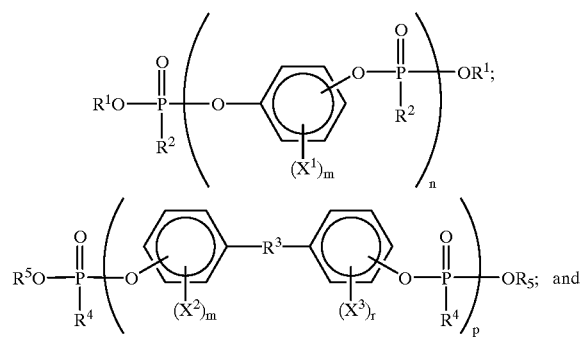

-continued

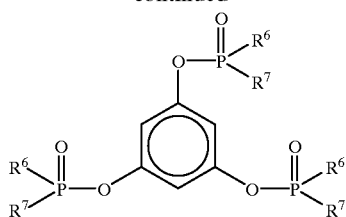

including mixtures thereof, in which $R^1$, $R^3$ and $R^5$ are, independently, hydrocarbon; $R^2$, $R^4$, $R^6$ and $R^7$ are, independently, hydrocarbonoxy; $X^1$, $X^2$ and $X^3$ are halogen; m and r are 0 or integers from 1 to 4, and n and p are from 1 to 30.

6. The process of claim 1, wherein the organic phosphate compound comprises at least one of the group consisting of: phenyl bisdodecyl phosphate, phenylbisneopentyl phosphate, phenyl-bis(3,5,5'-tri-methyl-hexyl phosphate), ethyldiphenyl phosphate, 2-ethyl-hexyldi(p-tolyl) phosphate, bis-(2-ethylhexyl) p-tolylphosphate, tritolyl phosphate, bis-(2-ethylhexyl) phenyl phosphate, tri-(nonylphenyl) phosphate, di(dodecyl) p-tolyl phosphate, tricresyl phosphate, triphenyl phosphate, dibutylphenyl phosphate, 2-chloroethyldiphenyl phosphate, p-tolyl bis(2,5,5'-trimethylhexyl) phosphate, and 2-ethylhexyldiphenyl phosphate.

7. A thermoplastic composition made by the process of claim 1.

8. Articles formed out of the composition made by the process of claim 1.

9. The process of claim 1, further comprising:
grinding said solid concentrate to a particle size less than about 3 millimeters.

10. The process of claim 1, further comprising:
intimately admixing said solid concentrate with at least one alkylene aromatic compound present in an amount of about 20% to about 60% by weight based on the weight of the entire composition.

11. The process of claim 1, wherein said solid concentrate is intimately admixed additionally with at least one additive selected from the group consisting of stabilizers, dyes, drip suppressors, pigments, and mixtures thereof.

12. The process of claim 1, wherein the concentrate comprises less than about 50% by weight of the organic phosphate based on the total weight of the concentrate.

13. A process for the manufacture of a polyphenylene ether thermoplastic, comprising:

preparing a solid concentrate comprising a polyphenylene ether resin and an organic phosphate compound, wherein said solid concentrate has less than 5% by weight of particles less than about 75 micrometers, wherein the polyphenylene ether resin is present at about 5 to about 70 percent by weight based upon the weight of the entire composition.

14. The process of claim 13, wherein the solid concentrate comprises at least about 5% by weight of the organic phosphate compound.

15. A process for the manufacture of a polyphenylene ether thermoplastic, comprising:

preparing a solid concentrate consisting essentially of
(a) a polyphenylene ether resin; and
(b) an organic phosphate in an amount greater than about 5% by weight based on the weight of polyphenylene ether;

wherein less than 5% by weight of said solid concentrate is present as particles having particle size less than about 75 micrometers.

16. A process for the manufacture of a polyphenylene ether thermoplastic, comprising:

preparing a solid concentrate consisting essentially of (a) a polyphenylene ether resin; and (b) an organic phosphate in an amount greater than about 5% by weight based on the weight of polyphenylene ether; wherein less than 5% by weight of said solid concentrate is present as particles having particle size less than about 75 micrometers;

grinding said solid concentrate to a form a ground solid concentrate of particle size less than about 3 millimeters; and intimately admixing said ground solid concentrate with at least one alkylene aromatic compound present in an amount of about 20% to about 60% by weight based on the weight of the entire composition.

17. A polyphenylene ether solid concentrate, consisting essentially of: (a) a polyphenylene ether resin; and (b) an organic phosphate in an amount greater than about 5% by weight based on the weight of polyphenylene ether; wherein less than 5% by weight of said solid concentrate is present as particles having particle size less than about 75 micrometers.

* * * * *